(12) United States Patent
Grasbeck et al.

(10) Patent No.: US 7,221,918 B1
(45) Date of Patent: May 22, 2007

(54) DIGITAL DC-OFFSET CORRECTION CIRCUIT FOR AN RF RECEIVER

(75) Inventors: Ari Juhani Grasbeck, Vaasa (FI); Mikael Sporron, Stockholm (SE)

(73) Assignee: National Semiconductor Corporation, Santa Clara, CA (US)

( * ) Notice: Subject to any disclaimer, the term of this patent is extended or adjusted under 35 U.S.C. 154(b) by 425 days.

(21) Appl. No.: 10/638,959

(22) Filed: Aug. 11, 2003

(51) Int. Cl.
H04B 7/00 (2006.01)
H04B 1/16 (2006.01)
H04B 1/06 (2006.01)

(52) U.S. Cl. .............................. 455/251.1; 455/200.1; 455/227; 375/148; 375/346

(58) Field of Classification Search ............. 455/251.1, 455/130, 136–138, 177.1, 183.2, 192.1, 192.2, 455/200.1, 206, 227, 232.1, 233.1, 234.1, 455/273, 311, 323, 234.2
See application file for complete search history.

(56) References Cited

U.S. PATENT DOCUMENTS

| | | | |
|---|---|---|---|
| 5,140,699 A * | 8/1992 | Kozak | 455/84 |
| 5,757,858 A * | 5/1998 | Black et al. | 375/295 |
| 6,173,302 B1 | 1/2001 | Piirainen | |
| 6,233,594 B1 | 5/2001 | Tan et al. | |
| 6,373,422 B1 | 4/2002 | Mostafa | |
| 6,421,402 B1 | 7/2002 | Piirainen | |
| 6,531,973 B2 | 3/2003 | Brooks et al. | |
| 6,552,675 B1 | 4/2003 | Allin et al. | |
| 6,577,258 B2 | 6/2003 | Ruha et al. | |
| 6,639,939 B1 * | 10/2003 | Naden et al. | 375/140 |
| 6,941,121 B2 * | 9/2005 | Chen | 455/232.1 |
| 2003/0139147 A1 * | 7/2003 | Shi | 455/82 |
| 2003/0231054 A1 * | 12/2003 | Magoon et al. | 330/9 |

* cited by examiner

Primary Examiner—Tony T. Nguyen

(57) ABSTRACT

An RF receiver comprising a radio-frequency (RF) down-converter for receiving and down-converting an input RF signal to a lower frequency analog signal (e.g., an IF signal or baseband signal) and analog processing circuitry for receiving the lower frequency analog signal from the RF down-converter and outputting a processed analog signal. The processed analog signal includes a DC-offset signal introduced by the RF down-converter and the analog processing circuitry. The RF receiver also comprises an ADC circuit for converting the processed analog signal to a sequence of digital samples and a DC-offset correction circuit for detecting the DC-offset signal in a digital output signal of the RF receiver. The DC-offset correction circuit adds a DC-offset correction signal to the lower frequency analog signal. Adding the DC-offset correction signal to the lower frequency analog signal reduces the DC-offset signal in the processed analog signal at the analog processing circuitry output.

20 Claims, 2 Drawing Sheets

DIGITAL DC-OFFSET CORRECTION CIRCUIT FOR AN RF RECEIVER

TECHNICAL FIELD OF THE INVENTION

The present invention is generally directed to radio frequency (RF) receivers and, in particular, to a DC offset correction circuit for use in an RF receiver.

BACKGROUND OF THE INVENTION

In order to get high performance in a conventional radio frequency (RF) receiver, it is often required that the input signals to internal components in the RF receive path be centered on zero volts (0 V). Even a small direct current (DC) offset voltage at the input of a component may have a large effect on the dynamic range of the component.

For example, many RF receivers comprise an analog-to-digital converter (ADC) that converts an analog pass band signal by using a high sampling frequency. One common ADC component comprises a sigma-delta (ΣΔ) modulator block followed by a decimation filter block. After the A/D conversion, the frequency of the pass band signal is decreased to the level of the base band, but the sampling frequency still remains high. Excessive sampling is reduced by the decimation filter, which also improves the signal-to-noise ratio.

A cascaded integrator comb (CIC) decimation filter is commonly used in many receive paths. In decimation, the sampling period is increased and the sampling frequency is decreased. This reduces the number of data points that must be processed and stored in each unit of time. A CIC decimation filter reduces sampling of a signal by a high coefficient. The CIC decimation filter typically comprises a chain of integrators, a decimation circuit, and chain of successive comb filters.

However, a problem associated with the decimation filter employing a chain of integrators is that the long-term expected value of input data must be zero. This means that data entering the CIC filter must not contain a DC offset voltage. Even a minor DC offset in the input data may cause saturation of the integrators and a functional error in the decimation filter.

Unfortunately, many of the analog circuits in the receive path preceding the decimation filter generate DC-offset voltages, either individually or by combined effect. This DC-offset may reduce the dynamic range of the decimation filter, an analog-to-digital converter, or another component in the receive path. This makes it very desirable to minimize DC-offset voltages.

Therefore, there is a need in the art for an improved radio frequency (RF) receiver. In particular, there is a need in the art of an RF receiver that minimizes DC offset voltages in the receive path, particularly at the inputs to an ADC block and a decimation filter.

SUMMARY OF THE INVENTION

To address the above-discussed deficiencies of the prior art, it is a primary object of the present invention to provide an improved DC-offset correction circuit for use in a radio-frequency (RF) receiver. According to an advantageous embodiment of the present invention, the RF receiver comprises: 1) a radio-frequency (RF) down-converter capable of receiving an input radio frequency (RF) signal and down-converting the input RF signal to a lower frequency analog signal, the lower frequency analog signal comprising one of an intermediate frequency signal and a baseband signal; 2) analog processing circuitry capable of receiving the lower frequency analog signal from the RF down-converter and outputting a processed analog signal, wherein the processed analog signal includes a DC-offset signal introduced by at least one of the RF down-converter and the analog processing circuitry; 3) an analog-to-digital converter (ADC) circuit capable of converting the processed analog signal to a sequence of digital samples; and 4) a DC-offset correction circuit capable of detecting the DC-offset signal in a digital output signal of the RF receiver and, in response to the detection, adding a DC-offset correction signal to the lower frequency analog signal, wherein addition of the DC-offset correction signal to the lower frequency analog signal reduces the DC-offset signal in the processed analog signal at an output of the analog processing circuitry.

According to one embodiment of the present invention, the DC-offset correction circuit comprises a DC-offset correction calculation circuit capable of determining the DC-offset correction signal from the digital output signal.

According to another embodiment of the present invention, the DC-offset correction calculation circuit determines the DC-offset correction signal from the digital output signal when the RF signal is not being received by the RF down-converter.

According to still another embodiment of the present invention, the DC-offset correction calculation circuit determines the DC-offset correction signal from the digital output signal during a time period between frames of data in the RF signal.

According to yet another embodiment of the present invention, the DC-offset correction calculation circuit determines the DC-offset correction signal when a gain of at least one amplifier in the analog processing circuitry is at a maximum value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation. A controller may be implemented in hardware, firmware or software, or some combination of at least two of the same. It should be noted that the functionality associated with a controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
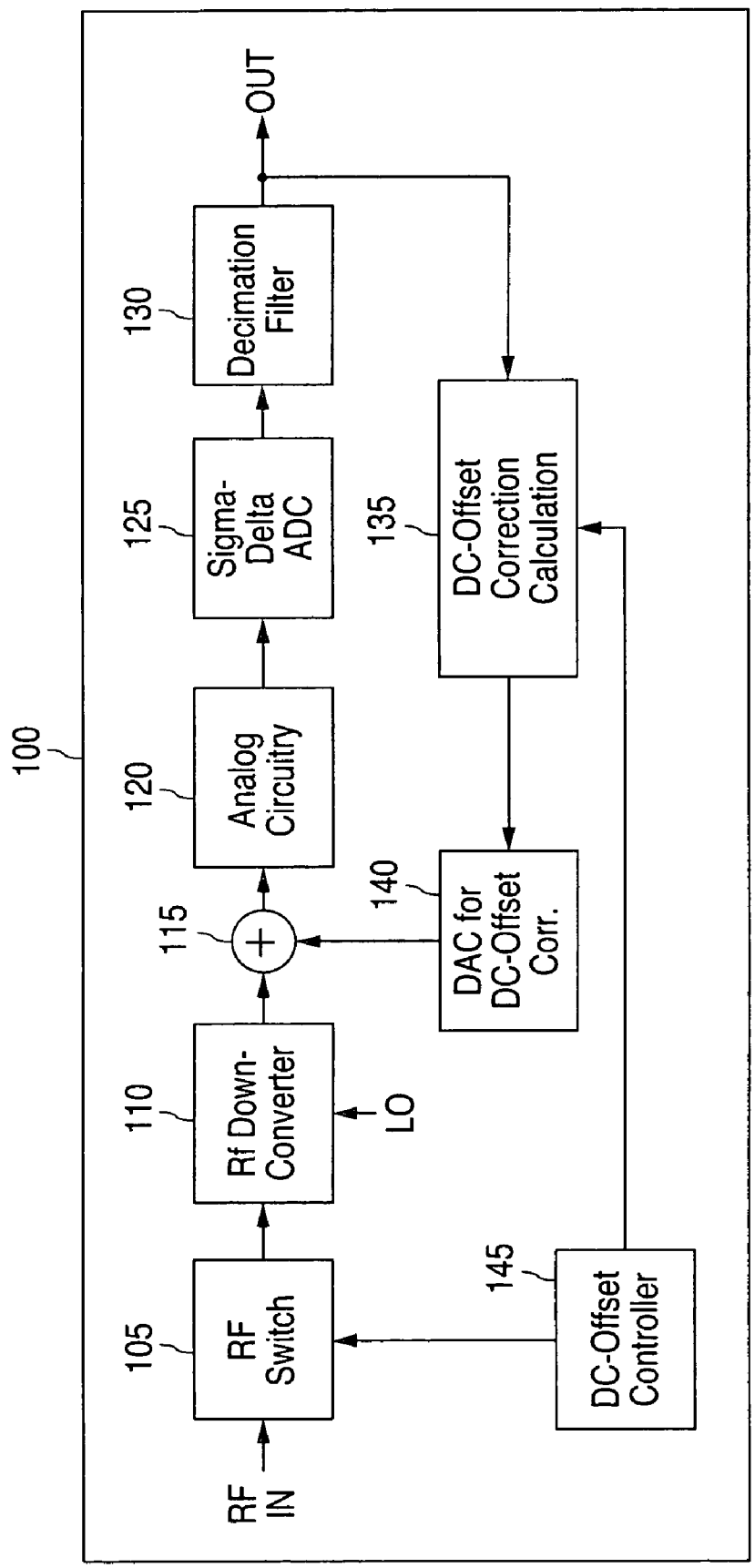
FIG. 1 illustrates an exemplary radio frequency (RF) receiver that incorporates a direct current (DC)-offset correction circuit according to an exemplary embodiment of the present invention.
Figure 2:
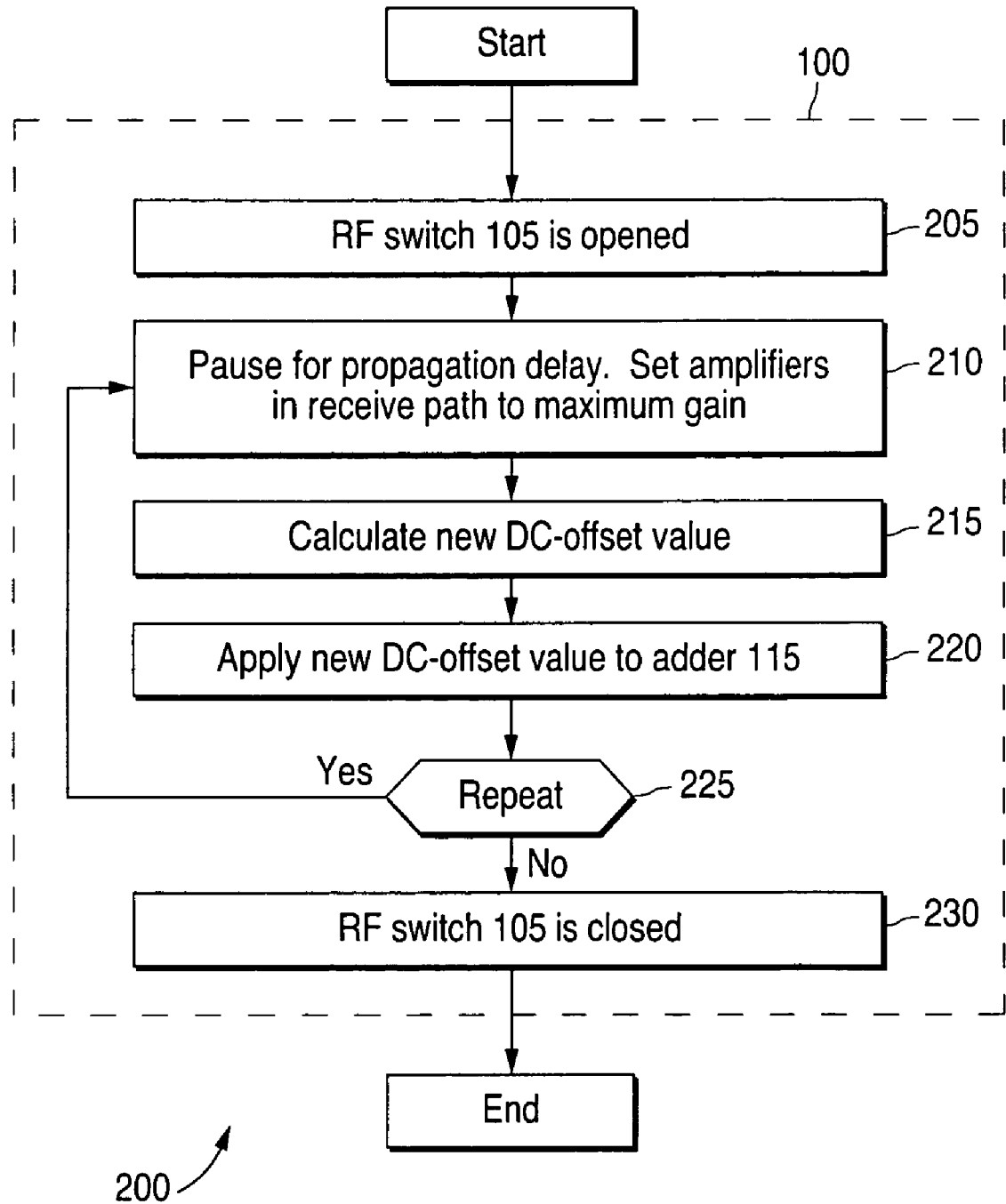
FIG. 2 is a flow diagram illustrating the operation of the exemplary DC-offset correction circuit according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

FIG. 1 illustrates exemplary radio frequency (RF) receiver 100, which incorporates a direct current (DC)-offset correction circuit according to an exemplary embodiment of the present invention. RF receiver 100 comprises radio frequency (RF) switch 105, radio frequency (RF) down-converter 110, adder 115, analog circuitry 120, sigma-delta analog-to-digital converter (ADC) 125, and decimation filter 130. RF receiver 100 further comprises DC-offset correction circuitry comprising DC-offset correction calculation block 135, digital-to-analog converter (DAC) for DC-offset correction block 140, and DC-offset controller 145.

For the sake of simplicity, it is assumed that RF receiver 100 has only one receive path. However, in alternate embodiments of the present invention, RF receiver 100 may have more than one receive path. RF receiver 100 may be, for example, a QPSK receiver that has both an in-phase (I) receive path and a quadrature (Q) receive path. Those skilled in the art will understand that, in these alternate embodiments, certain portions of the circuitry depicted in FIG. 1 must be replicated in each receive path. Since the I-signal and the Q-signal may have different DC-offset voltages, the compensation circuits for the signal paths are controlled separately, but synchronously.

During normal operation, RF switch 105 is closed and an incoming RF signal (RF In) is applied to the inputs of RF down-converter 110. RF down-converter 110 down-converts the RF In signal from an RF frequency to an intermediate frequency (IF) signal or a baseband signal by mixing with a local oscillator (LO) signal. Adder 115 adds a DC offset correction voltage received from DAC for DC-offset correction block 140 (hereafter, "DAC 140") and the DC-corrected signal is applied to the input of analog circuitry 120. Analog circuitry 120 is intended to be a generic representation of one or more conventional receive path components that are commonly found in receiver architectures. For example, analog circuitry 120 may comprise a plurality of amplifiers, filters, automatic gain control (AGC) circuits, and the like. The processed analog output of analog circuitry 120 is converted to a sequence of samples at a high data rate by sigma-delta ADC 125. Finally, decimation filter 130 decimates the samples from the output of sigma-delta ADC 125 to a plurality of digital values at a lower data rate to generate the output signal, OUT.

During routine operation, the receive path components of receiver 100, such RF down-converter 110 and analog circuitry 120, may introduce a DC offset voltage at the input of sigma-delta ADC 125. This decreases the dynamic range of sigma-delta ADC 125 and reduces the performance of receiver 100. To compensate for this, receiver 100 uses RF switch 105, adder 115, DC-offset correction calculation block 135, DAC 140, and DC-offset controller 145 to add a DC-offset correction voltage to the output of RF down-converter 110 that, in the ideal case, causes the output of analog circuitry 120 to have a zero DC-offset voltage.

According to the principles of the present invention, the DC offset correction is made during time periods in which no useful information is being received from the RF IN signal (e.g., during dead time between data frames). DC-offset controller 145, which directs the overall operation of the DC-offset correction circuitry, accomplishes this by opening RF switch 105 when data is not being received from the RF IN signal. This means that there is no input signal to the receive path when the DC-offset correction voltage is calculated.

FIG. 2 depicts flow diagram 200, which illustrates the operation of the exemplary DC-offset correction circuit according to one embodiment of the present invention. As noted above, RF switch 105 is opened during a time period when no desired RF input signal is expected, such as during the time gap between data frames (process step 205). DC-offset controller 145 then pauses briefly to account for the propagation delay from RF switch 105 to the output of decimation filter 130 (process step 210). During this process, the receive path receives no RF signal and the amplifiers in analog circuitry 140 may be set to maximum gain.

After the propagation delay has passed, DC-offset controller 145 causes the digital logic in DC-offset correction calculation block 135 to calculate a new value for the DC-offset correction voltage (process step 215). DC-offset correction calculation block 135 outputs this digital value to DAC 140. DAC 140 converts the DC offset correction voltage to an analog voltage that is applied to one input of adder 115 (process step 220). Adder 115 then adds the DC-offset correction voltage to the output of RF down-converter 110 to produce a DC-corrected voltage (which may be non-zero) that is applied to the input of analog circuitry 120. Ideally, the output of analog circuitry 120 has no DC-offset voltage at this point. However, that foregoing steps may be repeated, if necessary, to obtain a better result (process step 225). Once a final value is obtained, RF switch 105 is closed and the incoming RF IN signal is processed (process step 230).

Ideally, the target DC offset after compensation is within +/−100 mV at the input of sigma-delta ADC 125. In some embodiment, the analog DC offset compensation may be controlled in two different ways. The first approach is the internal DC compensation control loop illustrated and explained above. In the second approach, DC-offset correction calculation block 135 may receive a DC-offset correction value from an external source (not shown). This externally received DC-offset correction value is then applied to DAC 140.

The advantage of measuring the DC-offset voltage at the output of CIC decimation filter 130 is that the DC-offset value is time averaged. According to an exemplary embodiment of the present invention, the conversion of DC offset from units of voltage at the input of sigma-delta ADC 125 to a digital value at the output of decimation filter 130 may be defined as:

$$\text{Filter130(out)} = ADC(in) \times (R^N)/[fs\_in], \qquad \text{[Eqn. 1]}$$

where N denotes the order of CIC decimation filter 130, $R^N$ is the decimation ratio, ADC(in) is the DC-offset value in units of voltage at the input of sigma-delta ADC 125, and fs_in is the full scale input in volts of sigma-delta ADC 125.

TABLE 1 below lists exemplary design parameters that may be used in the DC offset calculation during an internal compensation control operation.

TABLE 1

| Parameter | Value |
|---|---|
| N | 4 |
| R | 48 |
| fs_in | 1.2 |
| CIC output scaling | 1024 (10 bits) |

The CIC output scaling number represents the data truncation at the output of decimation filter 130 from 26 bits (the CIC filter internal register size) down to 16 bits. Hence, by measuring the output of filter 130, the DC offset in units of millivolts (mV) may be calculated by:

$$ADC(in)(mV) = Filter130(out) \times (1.2/(48)^4) \times 1000$$
$$= Filter130(out)/4424.$$

Although the present invention has been described with an exemplary embodiment, various changes and modifications may be suggested to one skilled in the art. It is intended that the present invention encompass such changes and modifications as fall within the scope of the appended claims.

What is claimed is:

1. A radio-frequency (RF) receiver comprising:
a radio-frequency (RF) down-converter capable of receiving an input radio frequency (RF) signal and down-converting the input RF signal to a lower frequency analog signal;
analog processing circuitry capable of receiving the lower frequency analog signal from the RF down-converter and outputting a processed analog signal, wherein the processed analog signal includes a DC-offset signal;
an analog-to-digital converter (ADC) circuit capable of converting the processed analog signal to a sequence of digital samples; and
a DC-offset correction circuit capable of detecting the DC-offset signal in a digital output signal of the RF receiver and, in response to the detection, adding a DC-offset correction signal to the lower frequency analog signal, wherein addition of the DC-offset correction signal to the lower frequency analog signal reduces the DC-offset signal in the processed analog signal, and wherein the DC-offset correction signal is determined when a gain of at least one amplifier in the analog processing circuitry is at a maximum value.

2. The radio-frequency (RF) receiver as set forth in claim 1 wherein the DC-offset correction circuit comprises a DC-offset correction calculation circuit capable of determining the DC-offset correction signal from the digital output signal.

3. The radio-frequency (RF) receiver as set forth in claim 2 wherein the DC-offset correction calculation circuit determines the DC-offset correction signal from the digital output signal when the RF signal is not being received by the RF down-converter.

4. The radio-frequency (RF) receiver as set forth in claim 3 wherein the DC-offset correction calculation circuit determines the DC-offset correction signal from the digital output signal during a time period between frames of data in the RF signal.

5. The radio-frequency (RF) receiver as set forth in claim 3 wherein the DC-offset correction circuit further comprises an adder capable of receiving and adding the DC-offset correction signal from the DC-offset correction calculation circuit and the lower frequency signal from the RF down-converter and outputting to the analog processing circuitry a combined signal that is the sum of the DC-offset correction signal and the lower frequency signal.

6. The radio-frequency (RF) receiver as set forth in claim 5 wherein the DC-offset correction circuit further comprises a digital-to-analog converter (DAC) circuit capable of receiving the DC-offset correction signal from the DC-offset correction calculation circuit and outputting an analog DC-offset correction signal to the adder.

7. A radio-frequency (RF) receiver comprising:
a radio-frequency (RF) down-converter capable of receiving an input radio frequency (RF) signal and down-converting the input RF signal to a lower frequency analog signal;
analog processing circuitry capable of receiving the lower frequency analog signal from the RF down-converter and outputting a processed analog signal, wherein the processed analog signal includes a DC-offset signal;
an analog-to-digital converter (ADC) circuit capable of converting the processed analog signal to a sequence of digital samples; and
a DC-offset correction circuit capable of detecting the DC-offset signal in a digital output signal of the RF receiver and, in response to the detection, adding a DC-offset correction signal to the lower frequency analog signal, wherein addition of the DC-offset correction signal to the lower frequency analog signal reduces the DC-offset signal in the processed analog signal, and wherein the DC-offset correction circuit comprises:
a radio frequency (RF) switch coupling the RF down-converter to the input RF signal, wherein the RF switch disconnects the RF down-converter from the input RF signal when the DC-offset correction circuit determines the DC-offset correction signal; and
a decimation filter capable of receiving the sequence of digital samples at a first data rate from the ADC circuit and outputting the digital output signal of the RF receiver at a second data rate lower than the first data rate.

8. The radio-frequency (RF) receiver as set forth in claim 7 wherein the ADC circuit is a sigma-delta analog-to-digital converter (ADC) circuit.

9. The radio-frequency (RF) receiver as set forth in claim 8 wherein the DC-offset correction calculation circuit determines the DC-offset correction signal as a function of operating parameters of the sigma-delta ADC circuit.

10. The radio-frequency (RF) receiver as set forth in claim 8 wherein the DC-offset correction calculation circuit determines the DC-offset correction signal as a function of operating parameters of the decimation filter.

11. The radio-frequency (RF) receiver as set forth in claim 7, wherein the DC-offset correction signal is determined when a gain of at least one amplifier in the analog processing circuitry is at a maximum value.

12. A method of performing DC-offset correction in a radio frequency (RF) receiver comprising the steps of:
receiving an input radio frequency (RF) signal;

down-converting the input RF signal to a lower frequency analog signal in an RF down-converter;

processing the lower frequency analog signal in receive path analog processing circuitry and outputting a processed analog signal, wherein the processed analog signal includes a DC-offset signal;

converting the processed analog signal to a sequence of digital samples in an analog-to-digital converter (ADC) circuit;

detecting the DC-offset signal in a digital output signal of the RF receiver; and in response to the detection, adding a DC-offset correction signal to the lower frequency analog signal, wherein addition of the DC-offset correction signal to the lower frequency analog signal reduces the DC-offset signal in the processed analog signal, and wherein the DC-offset correction signal is determined when a gain of at least one amplifier in the receive path analog processing circuitry is at a maximum value.

13. The method of performing DC-offset correction as set forth in claim 12 further comprising the step of determining the DC-offset correction signal from the digital output signal when the RF signal is not being received by the RF down-converter.

14. The method of performing DC-offset correction as set forth in claim 13 wherein the step of determining the DC-offset correction signal from the digital output signal is performed during a time period between frames of data in the RF signal.

15. The method of performing DC-offset correction as set forth in claim 12 wherein the step of adding comprises the sub-steps of adding in an adder the DC-offset correction signal from the DC-offset correction calculation circuit and the lower frequency signal from the RF down-converter and outputting a combined signal to the analog processing circuitry, wherein the combined signal is the sum of the DC-offset correction signal and the lower frequency signal.

16. The method of performing DC-offset correction as set forth in claim 15 further comprising the sub-step of converting the DC-offset correction signal from the DC-offset correction calculation circuit to an analog DC-offset correction signal that is output to the adder.

17. The method of performing DC-offset correction as set forth in claim 16 wherein the step of determining the DC-offset correction signal from the digital output signal when the RF signal is not being received further comprises the sub-step of disconnecting the RF down-converter from the RF signal.

18. The method of performing DC-offset correction as set forth in claim 17 wherein the ADC circuit is a sigma-delta analog-to-digital converter (ADC) circuit.

19. A radio-frequency (RF) receiver comprising:

a radio-frequency (RF) down-converter capable of receiving an input radio frequency (RF) signal and down-converting the input RF signal to a lower frequency analog signal;

analog processing circuitry capable of receiving the lower frequency analog signal and outputting a processed analog signal, wherein the processed analog signal includes a DC-offset signal;

an analog-to-digital converter (ADC) circuit capable of converting the processed analog signal to a sequence of digital samples; and a DC-offset correction circuit capable of detecting the DC-offset signal and adding a DC-offset correction signal to the lower frequency analog signal, wherein addition of the DC-offset correction signal to the lower frequency analog signal reduces the DC-offset signal in the processed analog signal, and wherein the DC-offset correction signal is determined during a time period between frames of data in the RF signal.

20. The radio-frequency (RF) receiver as set forth in claim 19, wherein the DC-offset correction signal is determined when a gain of at least one amplifier in the analog processing circuitry is at a maximum value.

* * * * *